United States Patent [19]

Smith

[11] Patent Number: 4,673,332

[45] Date of Patent: Jun. 16, 1987

[54] LUBRICATION SEALS

[75] Inventor: Raymond Smith, Monclova, Ohio

[73] Assignee: Teledyne Industries, Inc., Los Angeles, Calif.

[21] Appl. No.: 634,213

[22] Filed: Jul. 25, 1984

[51] Int. Cl.[4] ............................................. F04D 29/10
[52] U.S. Cl. ................................. 415/113; 415/170 R; 277/28
[58] Field of Search .................. 415/110, 113, 170 R, 415/175, 176, 180; 277/28, 27, 9.5, 3, 72 R, 75, 76

[56] References Cited

U.S. PATENT DOCUMENTS

| Re. 25,227 | 8/1962 | Buck .................... 350/6.91 |
| 1,469,419 | 10/1923 | Layne et al. ............ 415/176 |
| 2,134,818 | 10/1938 | Hait .................... 415/176 |
| 2,584,705 | 2/1952 | Hornschuch ............. 415/118 |
| 2,719,737 | 10/1955 | Fletcher ............... 415/113 |
| 2,957,423 | 10/1960 | Audemar ................. 415/74 |
| 3,081,975 | 3/1963 | Sproule et al. ......... 415/168 |
| 3,459,430 | 8/1969 | Ball ...................... 277/3 |
| 3,494,292 | 2/1970 | Walker et al. .......... 415/110 |
| 3,622,164 | 11/1971 | Herbert ................. 277/28 |
| 3,679,217 | 7/1972 | Lesiecki ................ 277/28 |
| 4,168,070 | 9/1979 | Tsuchihashi et al. ..... 277/28 |
| 4,230,324 | 10/1980 | Derman ................. 415/110 |
| 4,373,858 | 2/1983 | Eastman ................ 415/112 |
| 4,415,165 | 11/1983 | Martini ................. 277/27 |

Primary Examiner—Robert E. Garrett
Assistant Examiner—John Kwon
Attorney, Agent, or Firm—Gifford, Groh, VanOphem, Sheridan, Sprinkle and Dolgorukov

[57] ABSTRACT

A seal continuously maintains a condition of fluid sealing between a housing and a shaft rotatably mounted in the housing, independently of the speed of rotation of the shaft. The seal includes a higher speed seal and a lower speed seal each disposed between the housing and the shaft. One of the seals is positioned axially stationary with respect to the shaft. The other of the seals is mobile (either axially or radially) with respect to the shaft, between a first position in sealing contact with the housing and shaft, and a second position out of sealing contact with the housing and shaft. Preferably, the lower speed seal is mobile, so as to be moved out of contact with the shaft when the higher speed seal operates effectively, so as to minimize wear on the seal.

18 Claims, 7 Drawing Figures

LUBRICATION SEALS

BACKGROUND OF THE INVENTION

1. Field of the Present Invention

The present invention relates generally to lubrication systems for bearing supporting the shaft in the turbine engine, and more particularly to seals which can be selectively engaged between the parts between which lubricant flow is to be controlled.

2. Description of the Prior Art

It is well known that turbine shafts typically rotate at high speeds within bearings supported in a turbine housing. As a result, bearings must be lubricated to prevent overheating and failure due to friction in the bearings. A previously known means for lubricating the bearing comprises partial or complete immersion of the rotating shaft in an oil supply reservoir. In order to prevent leakage of the lubricant along the shaft away from the oil reservoir, seal means have been disposed between rotating and stationary elements to prevent lubricant loss. Previously known seal structures between rotating and stationary parts often comprise dynamic seals in which carbon elements are held in contact with a metallic ring or face. While such seals function adequately during periods of operation, as rotary motion of one part relative to the other increases the sealing ability of the seals, prolonged storage or periods of non-operation enables seepage of the lubricant past the seal elements to occur, especially if the seals have become worn.

As a result, previously known dynamic seals require inspection and servicing at frequent intervals so that the seals continue to function adequately. Moreover, if the turbine is to be stored for an extended period of time, it is necessary as a practical matter to partially disassemble the turbine for the installation of positive static seals which prevent lubricant leakage during storage. Moreover, previously known positive seals are often constructed so that when the engine is again operated, the seals are destroyed and consumed by the engine operation. Thus, even the positive seals must be repeatedly replaced if the turbine engine is repeatedly stored and operated.

SUMMARY OF THE PRESENT INVENTION

The present invention overcomes the above-mentioned disadvantages by providing seals for a turbine engine lubrication system wherein the seal element can be variably positioned with respect to the elements against which it is to be sealed. Moreover, the present invention also includes a lubrication seal system in which the seal can be employed in combination with a dynamic seal so that lubricant leakage can be prevented during operation as well as non-operation of the turbine engine. Preferably, the seal element according to the present invention utilizes an elastomeric material disposed between and peripherally engaging the engine parts between which lubricant leakage is to be controlled, and includes means for displacing the elastomeric material into and out of engagement with one of the parts.

In one embodiment of the present invention, the seal element is supported by a spring-loaded piston acted upon by pressurized air from a pressurized air source. When the engine is not operating, the piston is forced against a fixed stop by the spring force and the elastomeric seal contacts an enlarged diameter portion of the shaft. When the engine is started and the speed of the engine increases, the air pressure from a source such as the compressor of the turbine, whose output pressure increases as turbine speed increases, is directed toward the piston to move the piston in an axial direction concentric with the shaft, and away from the enlarged diameter portion whereby the elastomeric seal is disengaged from the shaft. Such a structure permits disengagement of the seal element from the rotating shaft before any detrimental wear is inflicted upon the seal element.

In another embodiment of the present invention, the seal element comprises an annular seal housing with a hollow chamber in fluid communication with a pressurized fluid source such as the compressor. The annular seal housing includes deformable side walls which, when subjected to the pressurized fluid, urge the seal element out of contact with the rotating shaft of the turbine engine. The annular housing can be formed from the elastomeric material, or it can be made of a harder material which is provided with an elastomeric material layer positioned to abut against the shaft of the turbine.

In the preferred embodiment of the present invention, the lubrication system of the turbine engine is the immersion type wherein the shaft extends through a fluid reservoir and wherein the bearing is disposed between the reservoir and the seals constructed according to the present invention. A portion of the shaft intermediate the bearing and the seal element can be provided with a dynamic seal, such as a helical groove, which forces lubricant back toward the bearing or lubricant reservoir during operation of the engine. Preferably, the seal element of the present invention is selectively displaceable so that it engages the rotating shaft only when the turbine engine is inoperative.

Alternatively, the seal constructions according to the present invention can be used to control the amount of lubricant which passes through the gap between turbine parts when lubricant flow past the parts is desirable. In such a case, the seal need not employ an elastomeric material and may be spaced apart from the shaft at a predetermined distance, where the application of pressurized fluid adjusts the spacing as desired.

Thus the present invention provides a selectively displaceable seal element which can effectively seal or control the amount of leakage of lubricant between turbine housing and the rotating shaft beyond the bearing rotatably supports a turbine shaft in the turbine engine. Nevertheless, the seal element is not subjected to extreme frictional forces which can destroy previously known elastomeric seal elements during operation of the engine. Moreover, since the displacement of the seal element can be controlled by fluid pressure provided by the turbine engine, displacement of the seal element can be controlled automatically by the operating condition of the engine. Furthermore, the seals do not require repeated replacement or maintenance regardless of whether the engine is repeatedly operated or stored for an extended period of time.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the views and in which.

DETAILED DESCRIPTION OF THE PREFERRED EMBODIMENT OF THE PRESENT INVENTION

Figure 1:
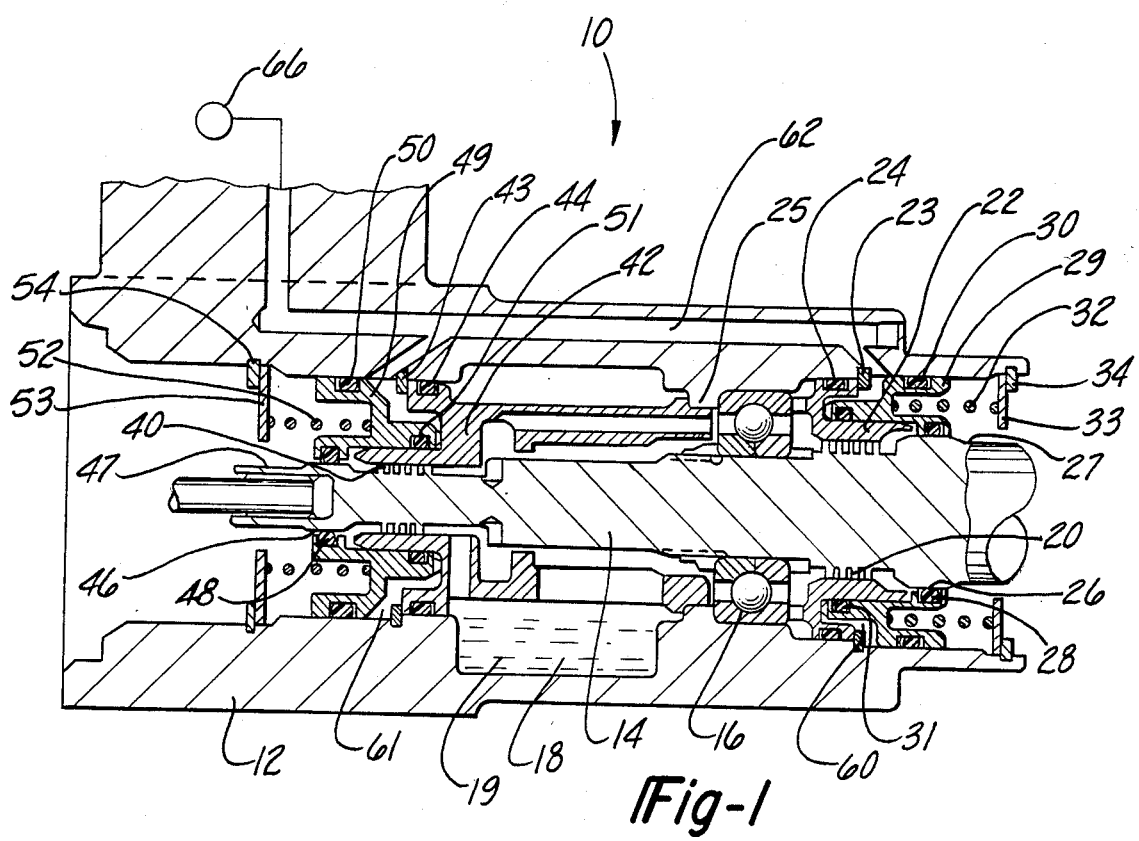
FIG. 1 is fragmentary sectional view of a portion of a turbine engine employing a combination of seal elements constructed in accordance with the present invention.

Referring first to FIG. 1, the lubrication system 10 employing seals in accordance with the present invention is thereshown comprising a turbine support housing 12 which supports a bearing 16 through which drive shaft 14 is rotatably mounted. The housing 12 defines a cavity 18 having a supply of lubricant 19 which flows through the bearing 16 during engine operation.

The shaft 14 includes a peripheral spiral groove 20 which rotates within an annular seal housing 22. The annular seal housing 22 is maintained in position by a snap ring 23 which also serves to retain the bearing 16 in position against the radially extending wall portion 25. The shaft 14 also includes a radially enlarged smooth peripheral portion 26 adjacent a peripheral shaft portion 27 having smaller diameter.

An axially displaceable piston 29 supports a seal element 28 in the form of an "o" ring so that the "o" ring abuts against the shaft portion 26. Piston 29 also includes a sealing "o" ring 30 positioned to engage and seal against the support housing 12 and a seal "o" ring 31 positioned to engage and seal against the annular seal housing 22. The piston 29 is normally held in a position in which the "o" ring 28 engages the shaft portion 26 by a spring 32 which extends between the piston 29 and the flat plate stop 33 retained within the support housing 12 by a snap ring 34. Nevertheless, it will be understood that piston 29 is axially displaceable against the force of a spring 32 in a manner to be described in greater detail hereinafter.

At the forward end of the shaft on the other side of the lubricant reservoir 18, the shaft 14 includes another spiral groove 40 operating within an annular seal housing 42. The annular seal housing 42 is held in place in the support housing 12 by means of a snap ring 43 and is sealed against the support housing 12 by a seal element in form of the "o" ring 44. A smooth, radially enlarged peripheral portion 46 of the shaft 14 adjacent a smaller diameter portion 47 is normally engaged by an elastomeric seal element 48 in the form of an "o" ring supported within an axially movable piston 49. The piston 49 is also sealed to the support housing 12 by an "o" ring 50 and is sealed against the annular housing 42 by seal element 51 in form of an "o" ring. The piston 49 is held in a position at which the "o" ring 48 contacts the shaft portion 46 by a spring 52 which extends between the piston 49 and a flat plate stop 53 retained within the support housing 12 by a snap ring 54.

Each piston 29 and 49, together with its respective annular seal housing 22 and 42, respectively, and the support housing 12 define an expansible chamber 60 and 62, respectively, on the side of the piston opposite to the side engaged by the spring, 32 and 52, respectively. The support housing 12 also includes a fluid passage way 62 in fluid communication with the chambers 60 and 61. The passageway 62 is also in fluid communication with a source of pressurized fluid, such as a compressor output 66 shown diagramatically in FIG. 1.

As the fluid pressure i.e. air pressure, developed by the engine compressor is a function of the engine speed, whereby the air pressure increases as the engine speed increases, delivery of the pressurized air to the passageway 62 to the cavities 60 and 61 displaces the pistons 29 and 49 against the force of the springs 32 and 52, respectively. As the springs are compressed, the pistons 29 and 49 move axially toward and against flat plate stops 33 and 53 respectively. As a result, the elastomeric sealing means 28 and 48 are axially positioned adjacent the smaller diameter portions 27 and 47 of the shaft 14, whereby seal elements are disengaged from the periphery of the shaft 14 and are not subjected to rubbing contact with the rotating shaft. Nevertheless, during operation of the engine at high speed, the spiral grooves 20 and 40 operating within the annular seal housings 22 and 42, respectively, direct lubricant toward the bearing and lubricant reservoir and prevent excessive loss of the lubricating fluid. Preferably, the air pressure level and the spring forces are balanced against the drag imposed by the seal's contact with the shaft to cause the movable pistons 29 and 49 to move against their respective stops at a speed low enough to prevent excessive wear of the seals, and at a speed sufficiently high so that the dynamic spiral groove seals 20 and 40 become effective. Thus, as just described, the lubrication seal system according to the present invention prevents loss of lubricating fluid during non-operating periods as well as periods of extended storage without disassembly and installation of special purpose seals.

Figure 3:
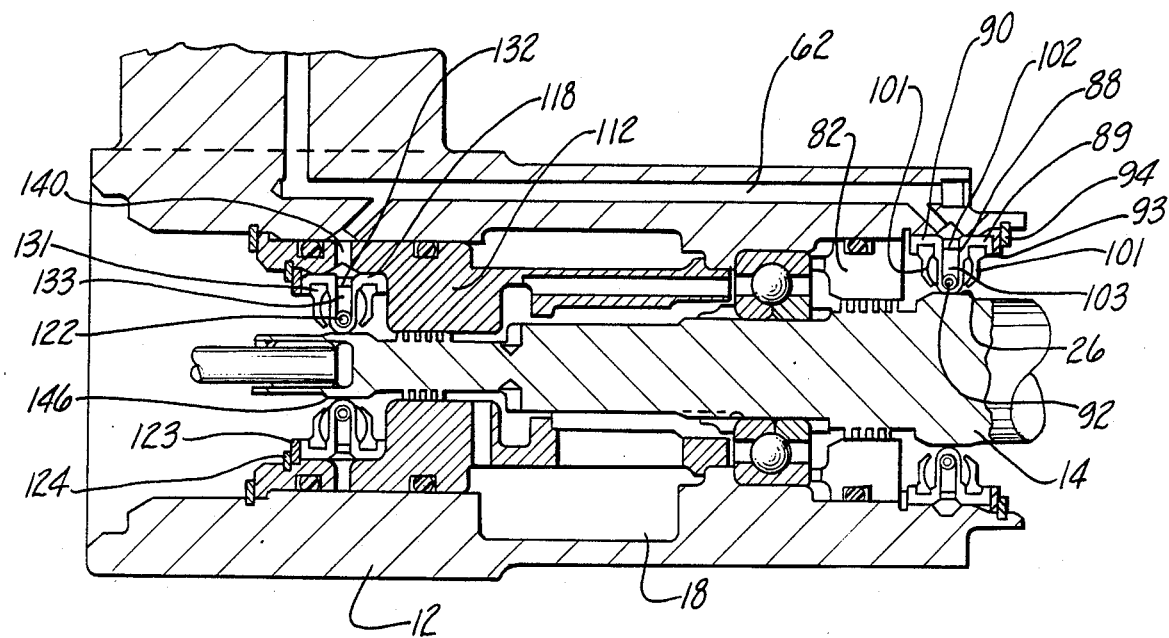
FIG. 3 is a fragmentary sectional view of a portion of a turbine engine having a combination of modified seal element constructed in accordance with the present invention.
Figure 4:
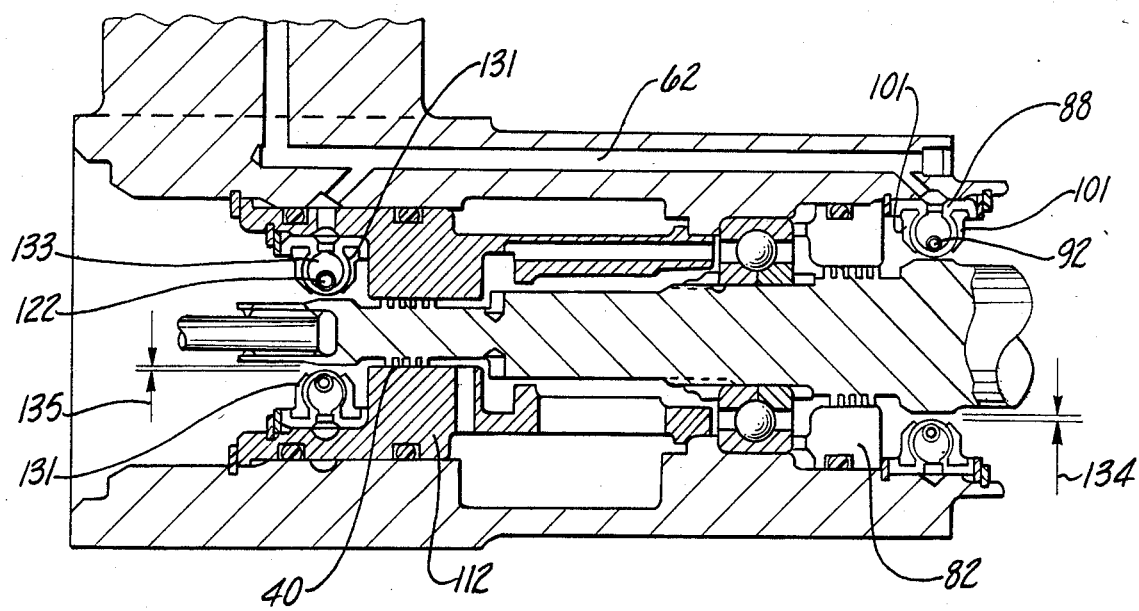
FIG. 4 is a fragmentary sectional view similar to FIG. 3 but showing the modified seal elements in a different operating position.

Referring now to FIGS. 3 and 4, a modified lubricant seal apparatus is shown employed in the turbine support housing 12. An elastomeric seal membrane 88 is molded to include end portions 89 and 90 radially engaged against the support housing 12 by a pair of spaced apart, annular side plates 101. The elastomeric membrane 88 is held in contact with the periphery of the shaft 14 by an annular garter spring 92 positioned intermediate side plates 101, thus forming a cavity 103. In addition, an apertured standoff ring 102 at the radially outermost end of the cavity 103 prevents collapse of the membrane 88 and provides fluid communication between passageway 62 and the cavity 103. The molded membrane 88, the annular plates 101 and the standoffs 102 are retained within a support housing 12 by a flat plate 93 locked in position by a snap ring 94.

Similarly, an annular seal housing 112 replaces the annular seal housing 42 of FIG. 1 on the other side of the lubricant reservoir 18. The ends of a molded and elastomeric membrane 118 are radially constrained against annular seal housing 112 by spaced apart side plates 131 and includes apertured standoff ring 132 to prevent collapsing of the cavity 133 and provide fluid communication between passageway 62 and the cavity 133 through port 140 in annular seal housing 112. The membrane 118 is held in contact with the periphery of the drive shaft 14 by an annular garter spring 122.

Figure 2:
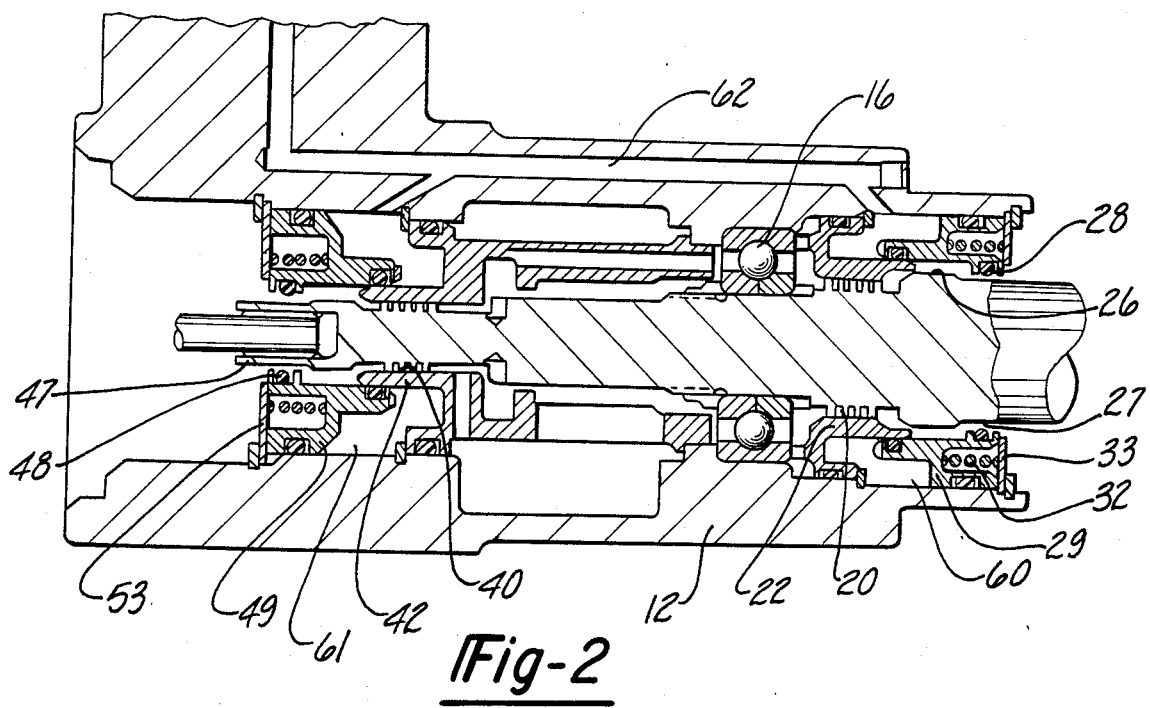
FIG. 2 is a fragmentary sectional view similar to FIG. 1 but showing the seal elements in a different operating position.

Like the annular seal housing 22 in FIGS. 1 and 2, an annular seal housing 82 confines the spiral groove 20 which forms a dynamic seal when the shaft 14 is rotated at sufficient speed to direct lubricant toward the bearing 16. Similarly, the annular seal housing 112 confines the spiral groove 40 so that rotation of the shaft directs lubricant toward the lubricant reservoir 18. While the use of an annular seal housing is not critical to the construction of a displaceable seal constructed in accordance with the present invention, and is primarily utilized in the preferred embodiment in the construction of the dynamic seal of the type shown, they can be used to position the elastomeric seal membrane in a desired position as evidenced by the annular seal housing 112.

As pressurized air from the engine compressor is provided to the cavities 103 and 133 through the passage 62, the side walls of the sealing membranes 88 and 118 expand against the arcuately shaped side walls of the annular retaining plates 101 and 131 respectively. The side walls permit expansion primarily in the axial direction so that expansion of the membranes causes a radial deflection of the garter springs 92 and 122 respectively, whereby a radial clearance 134 and 135, respectively, separates the elastomeric sealing membranes 88, 118 from the periphery of the shaft 14. Preferably, the compressor pressure levels are balanced against the spring forces of the garter springs 92 and 122 and the side walls' stiffness of the elastomeric membranes 88 and 118 to cause release of the membrane from the periphery of the shaft at a turbine speed low enough to prevent excessive wear of the sealing membrane but at a speed sufficiently high for the dynamic groove seals 20 and 40 to become effective.

Figure 5:
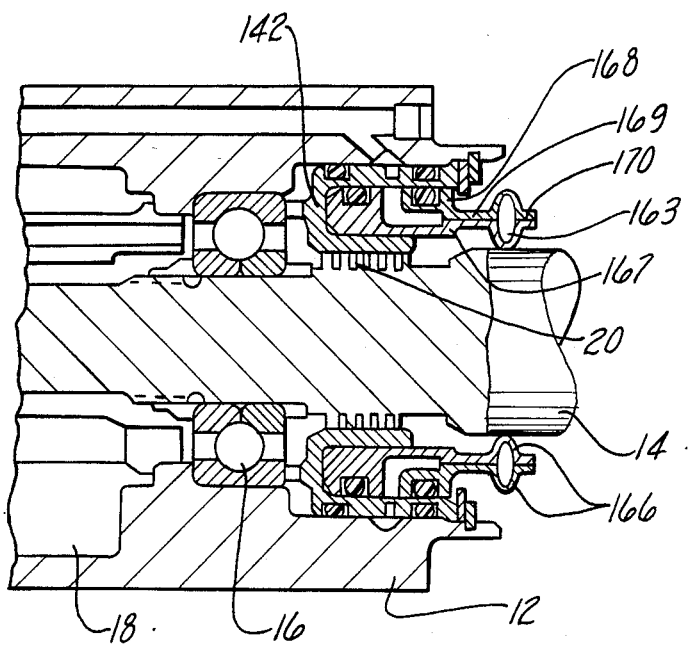
FIG. 5 is a fragmentary sectional view of portion of the turbine engine utilizing further modified seal elements constructed in accordance with the present invention.
Figure 6:
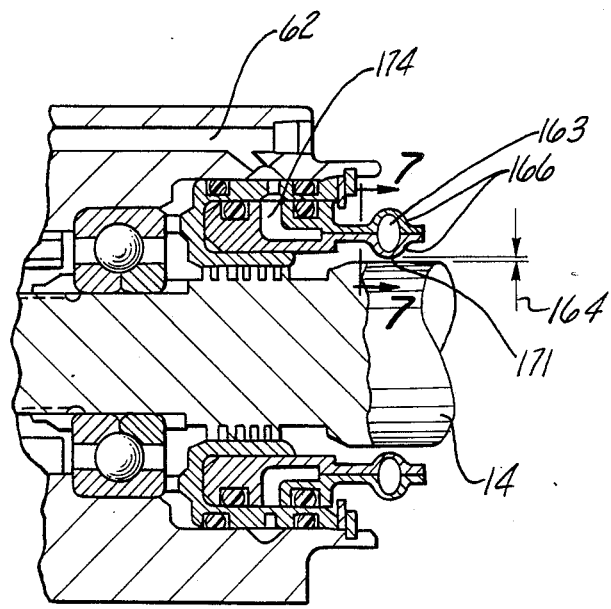
FIG. 6 is a fragmentary sectional view similar to FIG. 5 but showing the further modified seal element in a different operating position.
Figure 7:
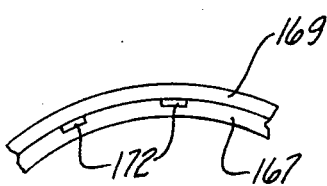
FIG. 7 is an enlarged, fragmentary sectional view taken substantially along the line 7—7 in FIG. 6.

A further modification of the sealing means according to the present invention is illustrated in FIGS. 5–7. Rather than an elastomeric membrane 88, these Figures show the use of a metallic seal element 168 comprising a radially inner element 167 and radially outer element 169. Each element 167 and 169 includes arcuately shaped metallic side wall portions 166 which, when the inner element 167 and outer element 169 are secured together by welding brazing, bonding or other suitable means, form an annular cavity 163. At least one of the inner or outer elements includes recesses forming a fluid passageway 174 between the inner and outer elements to provide fluid communication between fluid passageway 62 in support housing 12 and the cavity 163. An elastomeric membrane 171 is bonded to the radially inner periphery of seal element 168 so that a tight sealing engagement between the periphery of a shaft 14 and seal element 168 is normally maintained. Nevertheless, when sufficient pressurized fluid is delivered to the passageway 62, it passes through a port in the annular seal housing 142 in communication with the fluid passageway 174 and fluid passages 172 and into cavity 163. The fluid pressure causes expansion of the arcuately shaped metallic sidewalls 166, whereby the peripheral membrane 171 is spaced apart from the periphery of the shaft 14 as indicated by a gap 164 shown in FIG. 6. Such expansion is controlled by the shape of the side walls 166 which forms expansion primarily in the axial direction and causes a simultaneous radial deflection. Displacement prevents excessive wear of the elastomeric seal membrane 171 during high speed operation of the engine. The stiffness of the sidewall 166 provides a controlled expansion of the seal element 168 to cause a displacement of the elastomeric seal membrane 171 away from the shaft 14 at a speed low enough to prevent excessive wear of the membrane but at a speed sufficiently high for the dynamic spiral seal 20 to become effective.

From the foregoing, it can be seen that the present invention provides a lubricant seal system in which a seal element can be automatically displaced to prevent excessive wear or destruction of the sealing member when the turbine engine is being operated, and which provides a tight seal against lubricant leakage during low speed operation or storage of the engine. Moreover, it will be understood that use of the seal construction according to the present invention is not limited to a particular construction of a turbine engine, and can be employed with or without additional annular seal housings between the tubine housing and the rotating shaft. Moreover, it will be understood that the seal element can be axially displaced or radially displaced from the periphery of the turbine shaft and still remain within the scope of the present invention. Moreover, it will be understood that radial displacement of elastomeric membrane from the periphery of the turbine shaft can be controlled by rigid external structures or by the material construction of the seal element itself. Moreover, when the novel seal element is employed in combination with a dynamic seal structure, lubricant leakage is effectively controlled during operation as well as storage of the turbine engine.

Having thus described the present invention, many modifications thereto will become apparent to those skilled in the art to which it pertains without departing from the scope and spirit of the present invention as defined in the appended claims.

What is claimed is:

1. A seal for continuously maintaining a fluid seal between a housing and a shaft rotatably mounted in said housing, rotation of said shaft defining a longitudinal rotational axis thereof, said seal comprising a higher rotational speed seal and a lower rotational speed seal each disposed between said housing and said shaft, wherein one of said higher and lower speed seals is positioned axially stationary with respect to said shaft, and the other of said lower and higher speed seals is mobile with respect to said shaft between a first position in sealing contact with said shaft and said housing, and a second position out of sealing contact with at least one of said shaft and said housing, such that an effective fluid seal is continuously maintained between said shaft and said housing independently of the speed of rotation of said shaft.

2. The invention according to claim 1, wherein said other of said lower and higher speed seals is axially mobil with respect to said shaft.

3. The invention according to claim 1, wherein said other of said lower and higher speed seals is radially mobile with respect to said shaft.

4. The invention according to claim 2, wherein said lower speed seal comprises an O-ring disposed about said shaft and axially mobile with respect to said shaft, and means for bringing said O-ring into contact with said shaft.

5. The invention according to claim 2, wherein said shaft comprises a first surface engageable with said Oring and a second surface radially inward of said first surface and axially spaced therefrom, such that when said Oring in said first position said O-ring sealingly abuts said first surface of said shaft, and in said second position is spaced radially outwardly from said second surface of said shaft.

6. The invention according to claim 2, wherein said higher speed seal is axially stationary with respect to said shaft and comprises a helical groove seal formed on said shaft.

7. The invention according to claim 2, wherein said seal comprises an annular piston disposed about said shaft and carrying the mobile one of said higher and lower speed seals thereon; biasing means between said piston and said housing for maintaining said mobile one of said higher and lower speed seals in said first position; and means for applying pressure to said piston so as to move said mobile one of said higher and lower speed seals to said second position.

8. The invention according to claim 7, wherein said axially stationary one of said higher and lower speed seals comprises a helical groove seal on said shaft.

9. The invention according to claim 7, wherein said annular piston carries said lower speed seal thereon, and said lower speed seal comprises an O-ring contactable with said shaft.

10. The invention according to claim 9, wherein said shaft comprises a first surface engageable with said Oring and a second surface radially inward of said first surface and axially spaced therefrom, such that when said Oring is in said first position said O-ring sealingly abuts said first surface of said shaft, and in said second position is spaced radially outwardly from said second surface of said shaft.

11. The invention according to claim 7, wherein said pressure applying means comprises an at least somewhat fluidly sealed chamber between said annular piston and said housing, and means for selectively applying a pressurized fluid to said chamber.

12. The invention according to claim 2, wherein said housing comprises a portion of a turbine engine, and said shaft is mounted to said housing by a bearing, wherein said seal comprises two pairs of higher and lower speed seals, and wherein each of said pairs is disposed on opposite axial sides of said bearing.

13. The invention according to claim 12, wherein said housing includes a lubricant reservoir between said pair of seals and means for supplying a lubricant to said bearing.

14. The invention according to claim 11, wherein said pressure applying means is responsive to the speed of rotation of said shaft.

15. The invention according to claim 3, wherein said axially stationary one of said higher and lower speed seals comprises a helical groove seal on said shaft.

16. The invention according to claim 3, wherein said seal further comprises means for biasing said mobile one of said higher and lower pressure seals against said shaft, and means for applying pressure to said mobile one of said higher and lower speed seals so as to move said mobile one away from said shaft.

17. The invention according to claim 16, wherein said mobile one of said higher and lower speed seals comprises an elastomeric membrane defining an expansible chamber therein, and a spring disposed about said shaft in said membrane chamber, said chamber being in fluid communication with said pressure providing means, such that actuation of said pressure providing means axially expands said membrane chamber and draws said spring away from said shaft.

18. The invention according to claim 16, wherein said seal comprises radially inner and outer annular members disposed about said shaft, defining therebetween an axially expansible fluid chamber in fluid communication with said pressure providing means, and an elastomeric membrane bonded to said inner seal member so as to be contactable with said shaft, such that actuation of said pressure providing means axially expands said chamber and moves said elastomeric membrane radially away from said shaft.

* * * * *

UNITED STATES PATENT AND TRADEMARK OFFICE
CERTIFICATE OF CORRECTION

PATENT NO. : 4,673,332
DATED : June 16, 1987
INVENTOR(S) : Raymond Smith

It is certified that error appears in the above-identified patent and that said Letters Patent is hereby corrected as shown below:

Col. 3, line 1 after "is", insert --a--;

Col. 3, line 15 after "of" first occurrence, insert --a--;

Col. 4, line 10, delete "62" and insert --61--;

Col. 5, line 47 after "welding", insert --,--;

Claim 5, Col. 7, line 2, "Oring" should be --O-ring--.

Claim 5, line 68, delete "Oring" and insert --O-ring;

Claim 10, line 28, delete "Oring" and insert --O-ring--;

Claim 10, line 30, delete "Oring" and insert --O-ring--.

Signed and Sealed this

Tenth Day of November, 1987

Attest:

DONALD J. QUIGG

*Attesting Officer*     *Commissioner of Patents and Trademarks*